US007532564B2

(12) United States Patent
Foerster et al.

(10) Patent No.: US 7,532,564 B2
(45) Date of Patent: May 12, 2009

(54) SUB-BANDED ULTRA-WIDEBAND COMMUNICATIONS SYSTEMS

(75) Inventors: Jeffrey R. Foerster, Portland, OR (US); Minnie Ho, Palo Alto, CA (US); Srinivasa Somayazulu, Portland, OR (US); Keith R. Tinsley, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 408 days.

(21) Appl. No.: 10/241,889

(22) Filed: Sep. 11, 2002

(65) Prior Publication Data

US 2004/0047285 A1 Mar. 11, 2004

(51) Int. Cl.
*H04J 11/00* (2006.01)

(52) U.S. Cl. ............... 370/208; 370/210; 375/140; 375/147

(58) Field of Classification Search .......... 370/203–210
See application file for complete search history.

(56) References Cited

U.S. PATENT DOCUMENTS

| 5,677,927 | A | 10/1997 | Fullerton et al. |
| 5,945,940 | A * | 8/1999 | Cuomo .................. 342/90 |
| 6,384,773 | B1 * | 5/2002 | Martin et al. ............ 342/202 |
| 6,529,166 | B2 * | 3/2003 | Kanamaluru .......... 343/700 MS |
| 6,549,567 | B1 * | 4/2003 | Fullerton ................ 375/219 |
| 6,570,444 | B2 * | 5/2003 | Wright .................. 330/149 |
| 6,611,223 | B2 * | 8/2003 | Low et al. ............... 341/157 |
| 6,922,451 | B1 * | 7/2005 | Ichihara ................. 375/334 |
| 6,959,032 | B1 * | 10/2005 | Richards et al. .......... 375/138 |
| 7,027,493 | B2 * | 4/2006 | Richards ................ 375/150 |
| 7,058,004 | B2 * | 6/2006 | Jain et al. ................ 370/204 |
| 7,187,647 | B1 * | 3/2007 | Gerakoulis et al. ........ 370/208 |
| 2003/0161411 | A1 * | 8/2003 | McCorkle et la. ........ 375/295 |
| 2004/0005914 | A1 * | 1/2004 | Dear .................... 455/563 |
| 2004/0032364 | A1 * | 2/2004 | Knobel et al. ............ 341/133 |
| 2004/0048574 | A1 * | 3/2004 | Walker et al. ............ 455/63.1 |
| 2004/0071118 | A1 * | 4/2004 | Dabak et al. ............. 370/335 |
| 2005/0094709 | A1 * | 5/2005 | Lakkis .................. 375/130 |
| 2005/0254554 | A1 * | 11/2005 | Melick et al. ............ 375/130 |

FOREIGN PATENT DOCUMENTS

WO PCT/US 03/28085 9/2003

OTHER PUBLICATIONS

Lie-Liang Yang, et al., "Residue Number System Assisted Fast Frequency-Hopped Synchronous Ultra-Wideband Spread-Spectrum Multiple-Access: A Design Alternative to Impulse Radio". IEEE Journal on Selected Areas of Communications, vol. 20., No. 9, Dec. 2002, pp. 1652-1663. XP-002272167 ISSN: 0733-8716.
PCT/US03/28085 Int'l Preliminary Report on Patentability.

* cited by examiner

*Primary Examiner*—Michael J Moore, Jr.
(74) *Attorney, Agent, or Firm*—Blakely, Sokoloff, Taylor & Zafman LLP

(57) ABSTRACT

A sub-banded ultra-wideband (SB-UWB) system may combine aspects of an orthogonal frequency division multiplexing (OFDM) modulation scheme with aspects of an ultra-wideband system. In one embodiment, the system may use orthogonal waveforms to form an ultra-wideband wireless communications system. In another embodiment, an FFT based implementation of the system may be used to generate and detect an SB-UWB waveform.

18 Claims, 8 Drawing Sheets s(t) = s₁(t) + s₂(t) + s₃(t) + s₄(t) + s₅(t) + s₆(t) : Concatenated OFDM waveform
sᵢ(t) : Sub-band waveform
N : Number of sub-bands (N=6 in this example)

SUB-BANDED ULTRA-WIDEBAND COMMUNICATIONS SYSTEMS

DESCRIPTION OF THE DRAWING FIGURES

The numerous advantages of the present invention may be better understood by those skilled in the art by reference to the accompanying figures in which.

DETAILED DESCRIPTION

Figure 1:
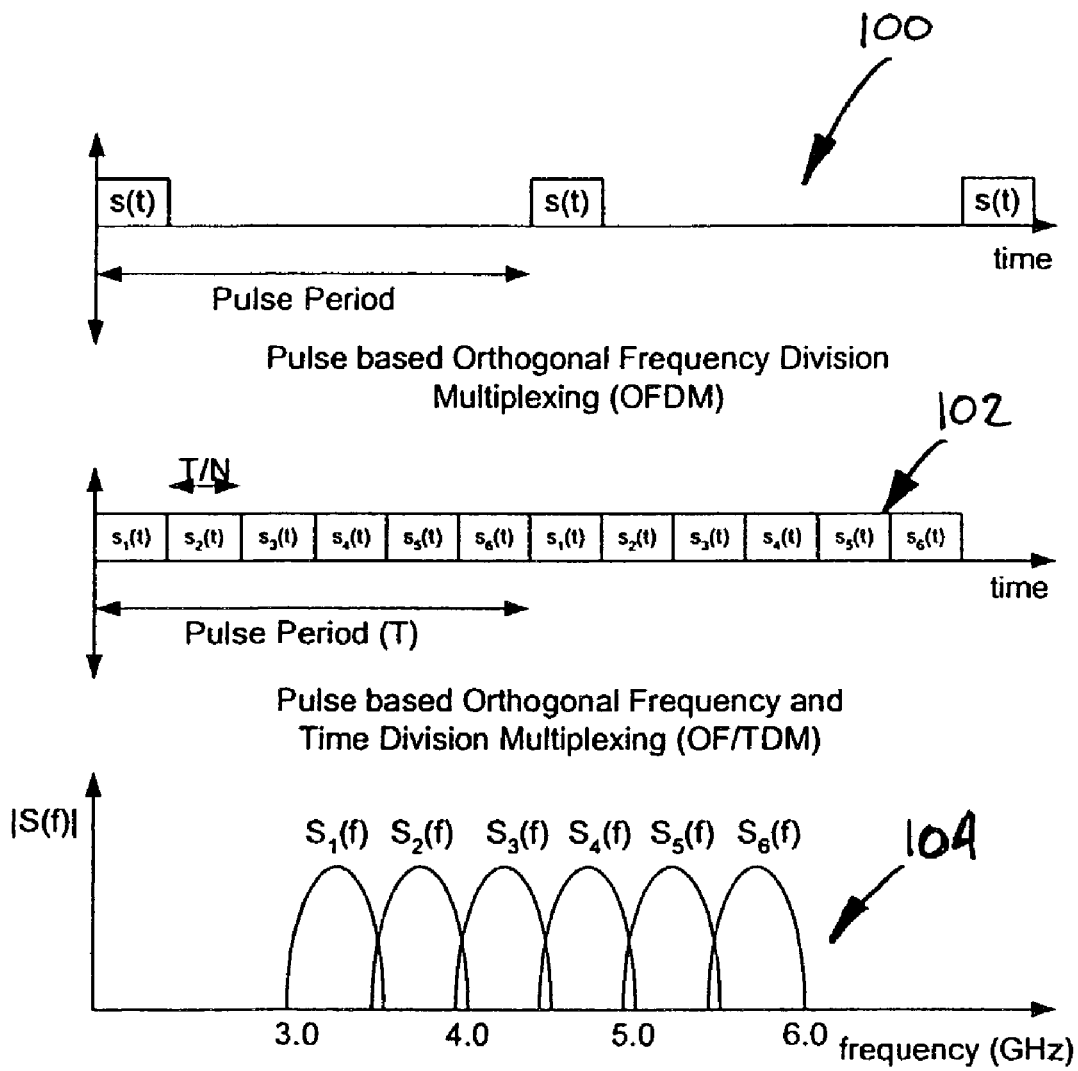
FIG. 1 is a time and frequency domain representation of a sub-banded ultra-wideband (SB-UWB) system in accordance with an embodiment of the present invention.

Referring now to FIG. 1, a time and frequency domain representation of a sub-banded ultra-wideband (SB-UWB) system in accordance with an embodiment of the invention will be discussed. Ultra wide band communications may be defined as transmitting a radio signal across all or a portion of a range of frequencies simultaneously, although the scope of the invention is not limited in this respect. A sub-banded UWB signal may include at least one or more ranges of frequencies within the range of frequencies for the UWB signal, although the scope of the invention is not limited in this respect. As shown in FIG. 1, an example pulse based orthogonal frequency division multiplexing (OFDM) scheme is illustrated at graph 100, an example pulse based orthogonal frequency and time division multiplexing (OF/TDM) scheme is illustrated at graph 102, and an example frequency plot of concatenated OFDM waveforms is illustrated at graph 104. In the example shown in FIG. 1, six impulse radio ultra-wideband (IR-UWB) waveforms may be generated using an impulse having, for example, a 500 MHz bandwidth having a center frequency that may vary between 3 and 6 GHz, although the scope of the invention is not limited in this respect.

As shown in FIG. 1, unlike traditional OFDM systems, an SB-UWB implementation may provide the ability to separate waveforms in time as well as frequency. For example, as the duration of the impulse waveform increases, as the bandwidth of the sub bands decreases, the transmitted waveform may be continuous in time and may begin to resemble an OFDM waveform. The sub-bands also may include additional spreading of multiple pulses per bit in order to achieve a direct sequence SB-UWB (DS-SB-UWB) system, although the scope of the invention is not limited in this respect.

Utilizing an SB-UWB waveform, it may be relatively straightforward to overlay the waveform on top of narrowband interference. Thus, in a first embodiment of the invention, an overlay may be provided by not utilizing any frequency band in which there is strong narrowband interference, although the scope of the invention is not limited in this respect. Alternatively, most or all frequency bands may be used, but those that experience interference in proportion to the strength of that interference may be attenuated, resulting in a "water-filling" effect in the frequency domain, although the scope of the invention is not limited in this respect. Similarly, a sufficiently wideband single carrier waveform may be overlaid on dispersed narrowband signals by employing notch filters at both the transmitter and the receiver. The former notch filters may protect the narrowband waveforms, and the latter notch filters may protect the desired signal. The SB-UWB signal design may allow the same type of interference tolerance without using the notch filters, although the scope of the invention is not limited in this respect. Examples of a sub-band transmitter 200 and a receiver 300 are shown in FIGS. 2 and 3, respectively, based on an FFT/IFFT implementation.

In an alternative embodiment, the SB-UWB architecture may also be combined with other time domain spreading techniques, including the use of time-hopping (TH-SB-UWB) or direct sequence spreading (DS-SB-UWB) on each sub-band channel, although the scope of the invention is not limited in this respect. For a given multipath channel profile and interference environment, there may be an optimal configuration of the number of sub-bands, bandwidth of each sub-band, and time spreading desired for each sub-band in order to optimize the overall throughput of the system. In one embodiment of the invention, if the limit as the number of sub-bands reduces to one, the system may be similar to a typical IR-UWB system, although the scope of the invention is not limited in this respect.

Figure 2:
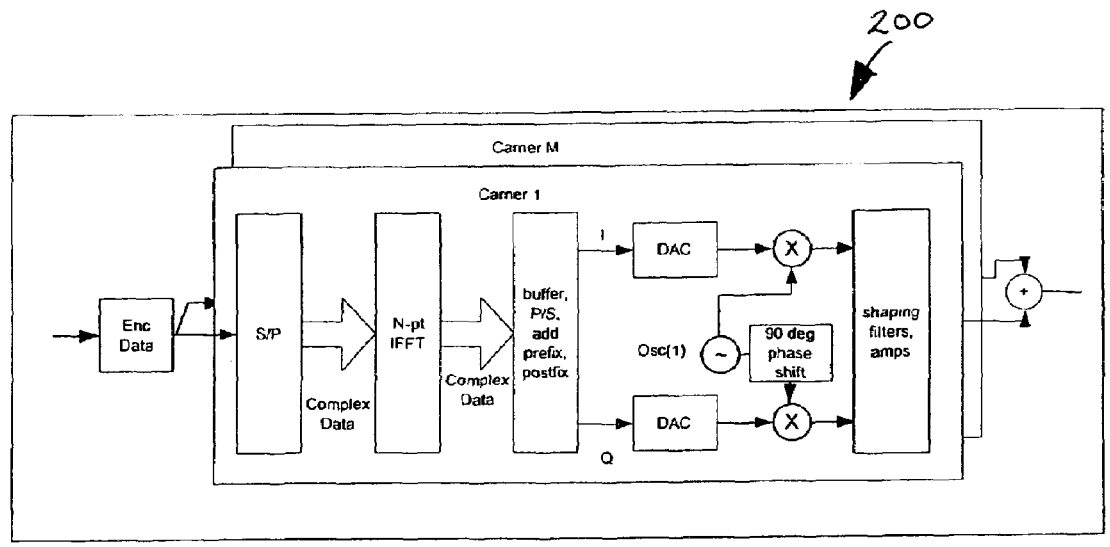
FIG. 2 is a diagram of a FFT based transmitter system in accordance with an embodiment of the present invention.
Figure 3:
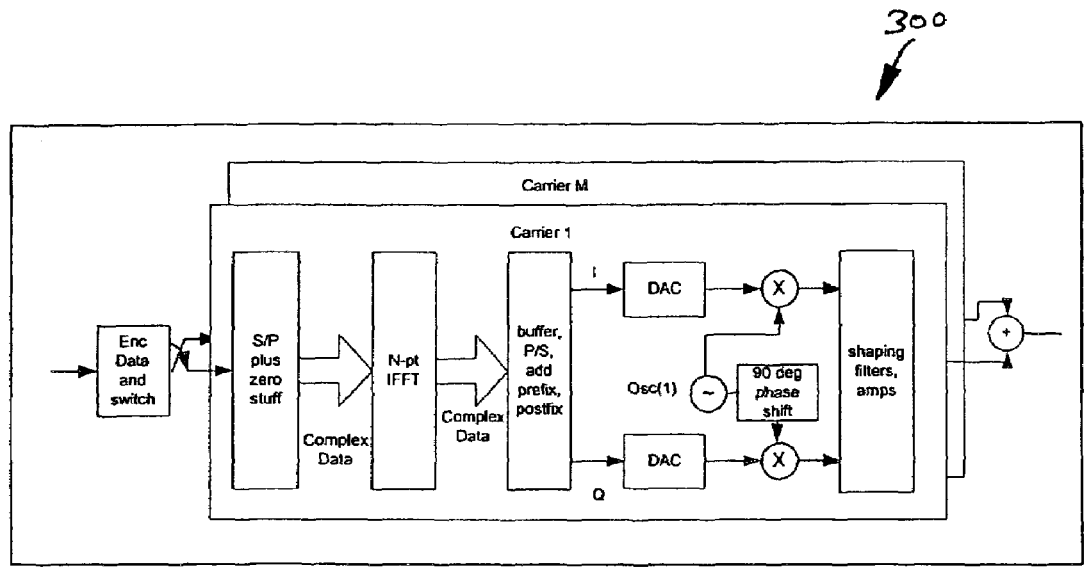
FIG. 3 is a diagram of a FFT based receiver system in accordance with an embodiment of the present invention.

Referring now to FIGS. 2 and 3, diagrams of a fast Fourier transform (FFT) based transmitter system and an FFT based receiver system in accordance with one embodiment of the present invention will be discussed. The example transmitter 200 shown in FIG. 2 illustrates an FFT/IFFT based implementation of an SB-UWB transmitter, and the example receiver 300 shown in FIG. 3 illustrates an FFT/IFFT based implementation of an SB-UWB receiver. The baseband sub-bands (0 to W GHz where W is the desired RF bandwidth of the transmitted waveform) may be generated by the N-point IFFT and following parallel-to-serial converter (P/S), although the scope of the invention is not limited in this respect. In a particular embodiment, the baseband bandwidth may be on the order of 2 GHz or greater, where the speed of the IFFT operation may be a limiting component, although the scope of the invention is not limited in this respect. In one embodiment, a 4-pt IFFT block may be utilized to maximize speed, although the N-pt IFFT operation may use any reasonable value of N. Such an implementation allows 4 sub-bands to be generated per carrier block. The carrier blocks may then be upconverted to a desired RF frequency, although the scope of the invention is not limited in this respect. Such an implementation may be arranged to implement the SB-UWB system in one or more ways, as discussed below.

In one embodiment, the SB-UWB system may be implemented with an OFDM waveform. Such an implementation may be based upon the transmission of all the sub-bands simultaneously, which may be done with a single carrier block, or multiple carrier blocks in order to fill up the desired RF frequencies, although the scope of the invention is not limited in this respect.

In another embodiment, the SB-UWB system may be implemented with a chirped waveform. In such an embodiment, sub-band waveforms may be transmitted at a different time in order to provide time diversity as well as frequency diversity between the transmitted bits. This implementation may help to reduce the receiver sensitivity to frequency offset mismatch in order to reduce or minimize adjacent channel interference, although the scope of the invention is not limited in this respect.

In another embodiment, the SB-UWB system may be implemented with a frequency-shift-keying (FSK) waveform. In such an embodiment, the encoded data bits may be used to select one of the frequencies to transmit across the channel rather than separately modulating the data onto the carriers and transmitting them simultaneously. Such a method may take advantage of orthogonal modulation and, by transmitting one carrier at a time, may reduce the transmit peak-to-average power ratio and thus the linearity requirements on the RF components, although the scope of the invention is not limited in this respect.

In another embodiment, the SB-UWB system may be implemented with a frequency-hopping (FH) waveform. In such an embodiment, a pseudo-random code of 4 bits, for example, may be used to select the sub-band that would carry the data, although the scope of the invention is not limited in this respect.

In one embodiment of the transceiver and receiver architecture of FIGS. 2 and 3, the duty cycle of the UWB OFDM signal, for example, may be typically less than 10%, in contrast with a narrow-band OFDM signal, fore example, which may be typically 100%. A lower duty cycle may allow the sub-bands to be much wider than in a narrow-band case, without using equalization. An FFT architecture for transmitter 200 and receiver 300 may allow the complexity of multiple analog oscillators to be provided in a digital FFT, although the scope of the invention is not limited in this respect.

Figure 4:
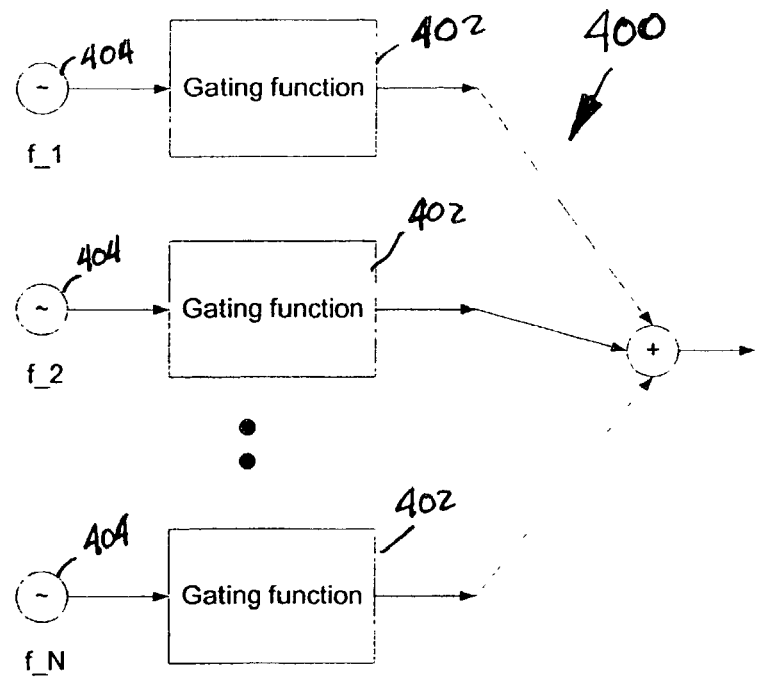
FIG. 4 is a diagram of a sub-banded UWB pulse generator in accordance with an embodiment of the present invention.

Referring now to FIG. 4, a diagram of a sub-banded UWB pulse generator in accordance with an embodiment of the present invention will be discussed. As shown with the example pulse generator 400 shown in FIG. 4, two or more sine wave generators 404 are utilized in parallel to generate a UWB waveform, although the scope of the invention is not limited in this respect. In an alternative embodiment, pulse generator 400 may be extended to include multiple phases, such as quaternary phase-shift-keying QPSK, although the scope of the invention is not limited in this respect. In one particular embodiment, two or more parallel gating functions 402 may be used, where one gating function may be a delayed version of another other gating function, although the scope of the invention is not limited in this respect. Alternatively, the phases of the carriers may be modulated, for example using phase-shifting-keying (PSK) systems, although the scope of the invention is not limited in this respect. By providing a choice of different frequencies and time windows, greater flexibility in signal design may be provided with pulse generator 400. In one embodiment, the signal energy may be spread more equally across the band, since, in a power spectral density (PSD) limited environment, for example where a PSD limit may be set by regulation, it may be desirable to have the spectrum as flat as possible, although the scope of the invention is not limited in this respect. In another embodiment, the widths of the individual windows may be adjusted in order to tailor the spectrum as desired, although the scope of the invention is not limited in this respect.

Figure 5:
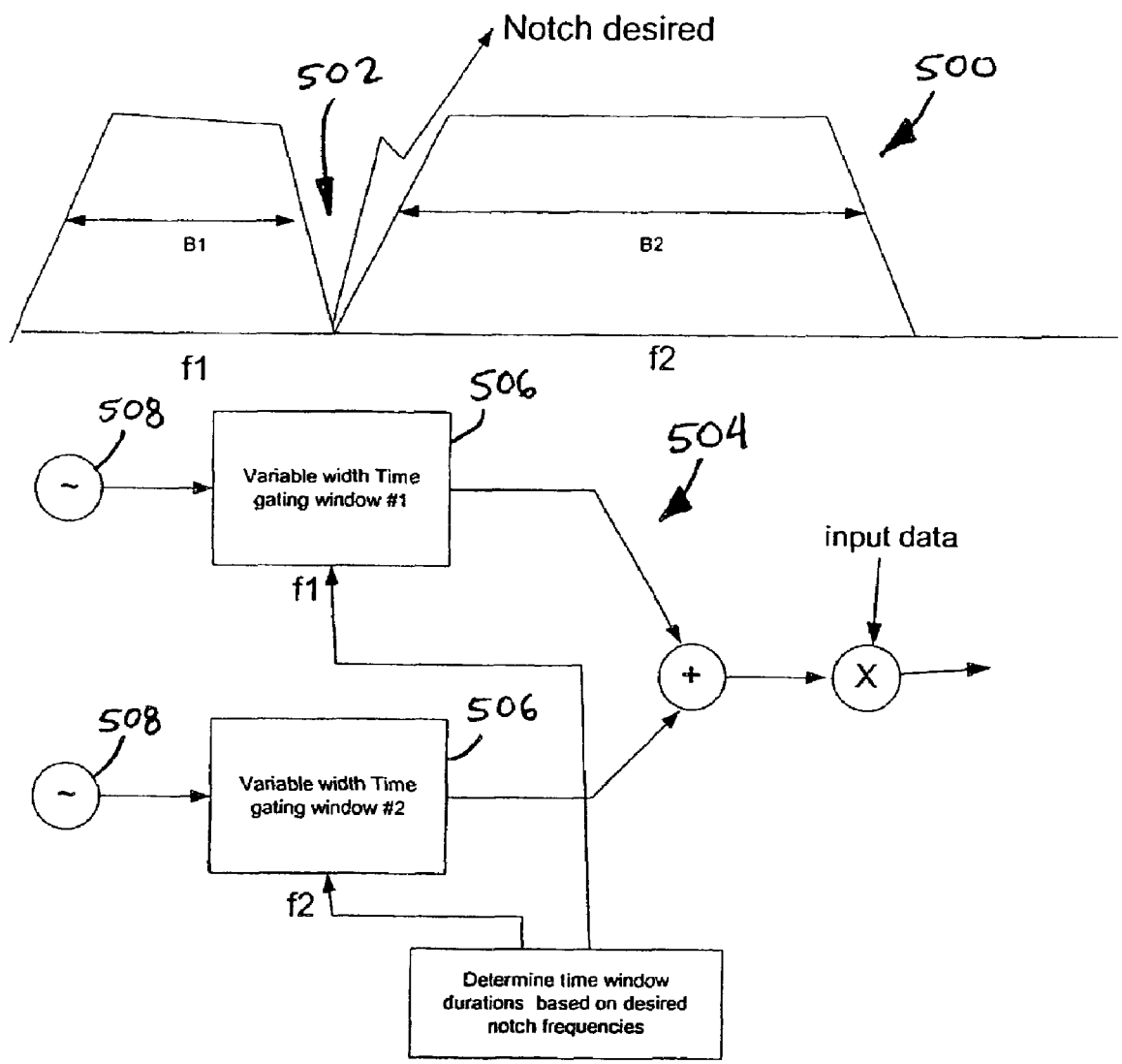
FIG. 5 is a diagram of a UWB transmitter utilizing a channelized technique in accordance with an embodiment of the present invention.

Referring now to FIG. 5, a diagram of a UWB transmitter utilizing a channelized technique in accordance with an embodiment of the present invention will be discussed. In the example shown in FIG. 5, a frequency plot of the waveform is shown at graph 500, where a system with two frequencies f1 and f2 is shown, along with a frequency band where a narrowband interferer may be present. In such an embodiment, the two bandwidths B1 and B2 may be adjusted in order to create a notch 502 in the spectrum at a desired frequency band. The bandwidths B1 and B2 in turn may be controlled by varying the width of the time gating windows 506 for oscillators 508, as shown in FIG. 5 using pulse generator 504. At the receive end, a matched filter may be created for the pulse based on the knowledge of the frequencies and the time window widths, although the scope of the invention is not limited in this respect.

Figure 6:
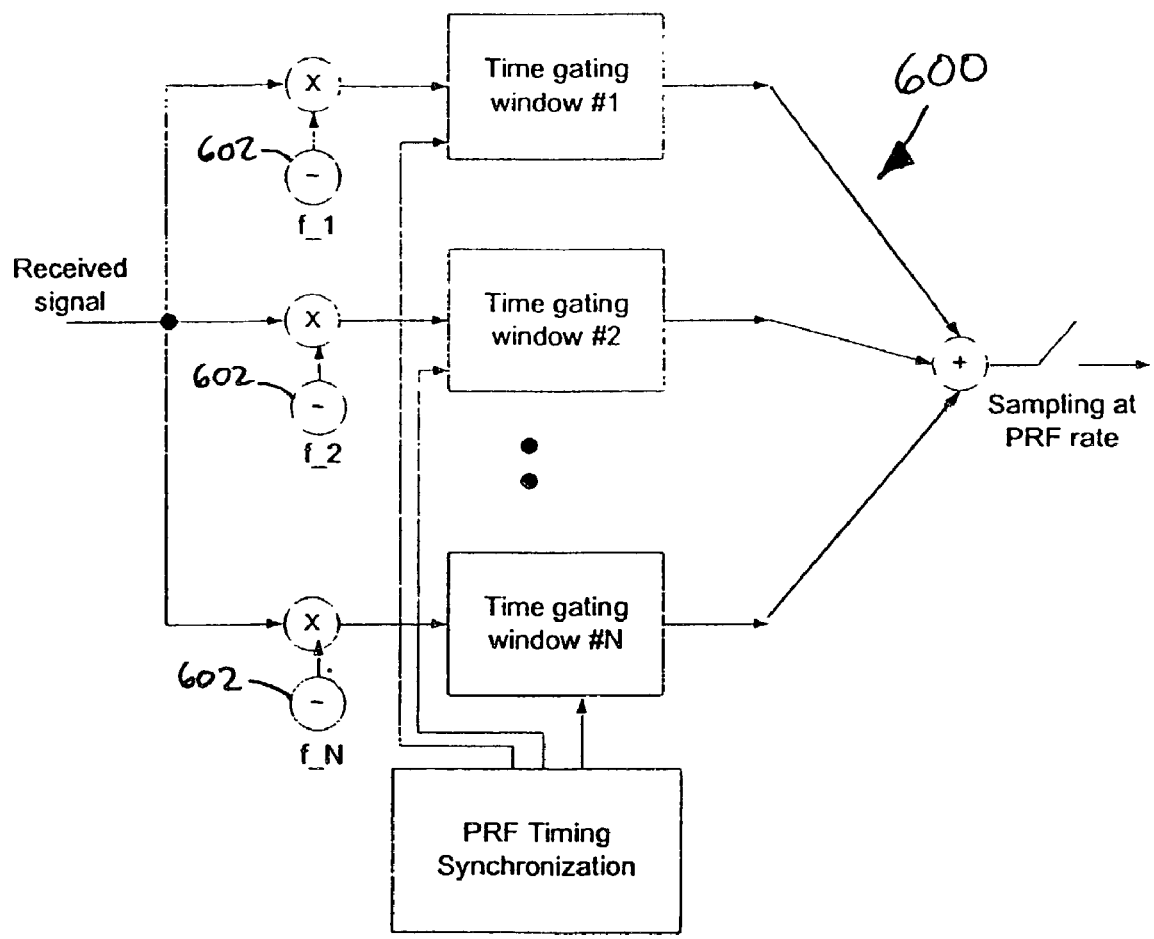
FIG. 6 is a diagram of a matched filter receiver for a multicarrier pulse generation system in accordance with an embodiment of the present invention.

As shown in FIG. 6, a diagram of a matched filter receiver for a multicarrier pulse generation system in accordance with an embodiment of the present invention will be discussed. An alternative pulse generator 600 is shown in FIG. 6. With the example pulse generator 600, the individual subcarriers may have filters matched to the pulses in their channels, although the scope of the invention is not limited in this respect. Alternatively, oscillators 602 may be used to synchronize to the transmit signal. Using oscillators 602 may provide a reduction in the synchronization complexity, since instead of aligning two narrowband pulses with each other, a narrowband pulse may be aligned to a nearest cycle of the oscillator, although the scope of the invention is not limited in this respect.

In a system utilizing such a signaling pulse, an access point may make interference measurements and estimation, and determine the time window widths for the different frequencies in order to generate an appropriate spectral shape. This information may be transmitted to one or more of the nodes on a common broadcast channel which may be one of the subcarrier frequencies, for example f1. The receivers may then create the subcarrier receiver matched filters by setting the appropriate time window widths for the local oscillators tuned to the different subcarrier frequencies, and may be able to receive the full bandwidth UWB signal transmissions, although the scope of the invention is not limited in this respect.

Figure 7:
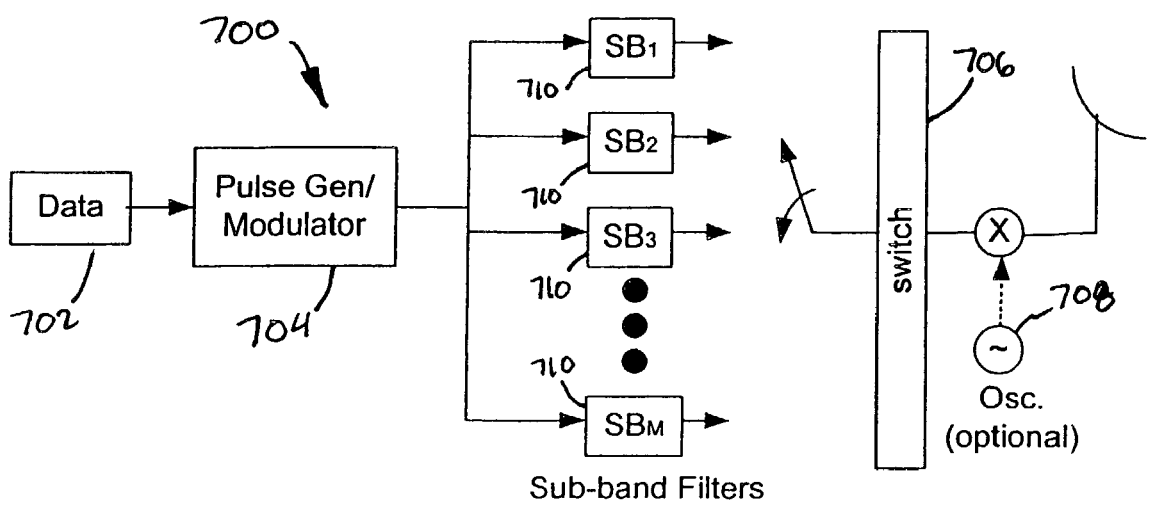
FIG. 7 is a diagram of a switched filter based transmitter in accordance with an embodiment of the present invention.

Referring now to FIG. 7, a diagram of a switched filter based transmitter in accordance with an embodiment the present invention will be discussed. The transmitter 700 shown in FIG. 7 may be an alternative example for generating a SB-UWB waveform based upon transmitting a single subband at a time. In such an embodiment, the data 702 may modulate a single wideband pulse generator 704, and an RF switch 706 may be used to choose between which of the sub-bands is transmitted over the air, although the scope of the invention is not limited in this respect. RF switch 706, in this embodiment, may operate at the pulse repetition rate which may be a function of a desired data rate to be supported. Also shown in FIG. 7 is an optional up-converter 708 that may be used to convert the sub-bands from an IF frequency up to desired RF frequencies in an embodiment where it may be desired to design sub-band filters 710 at a lower frequency band, although the scope of the invention is not limited in this respect.

Figure 8:
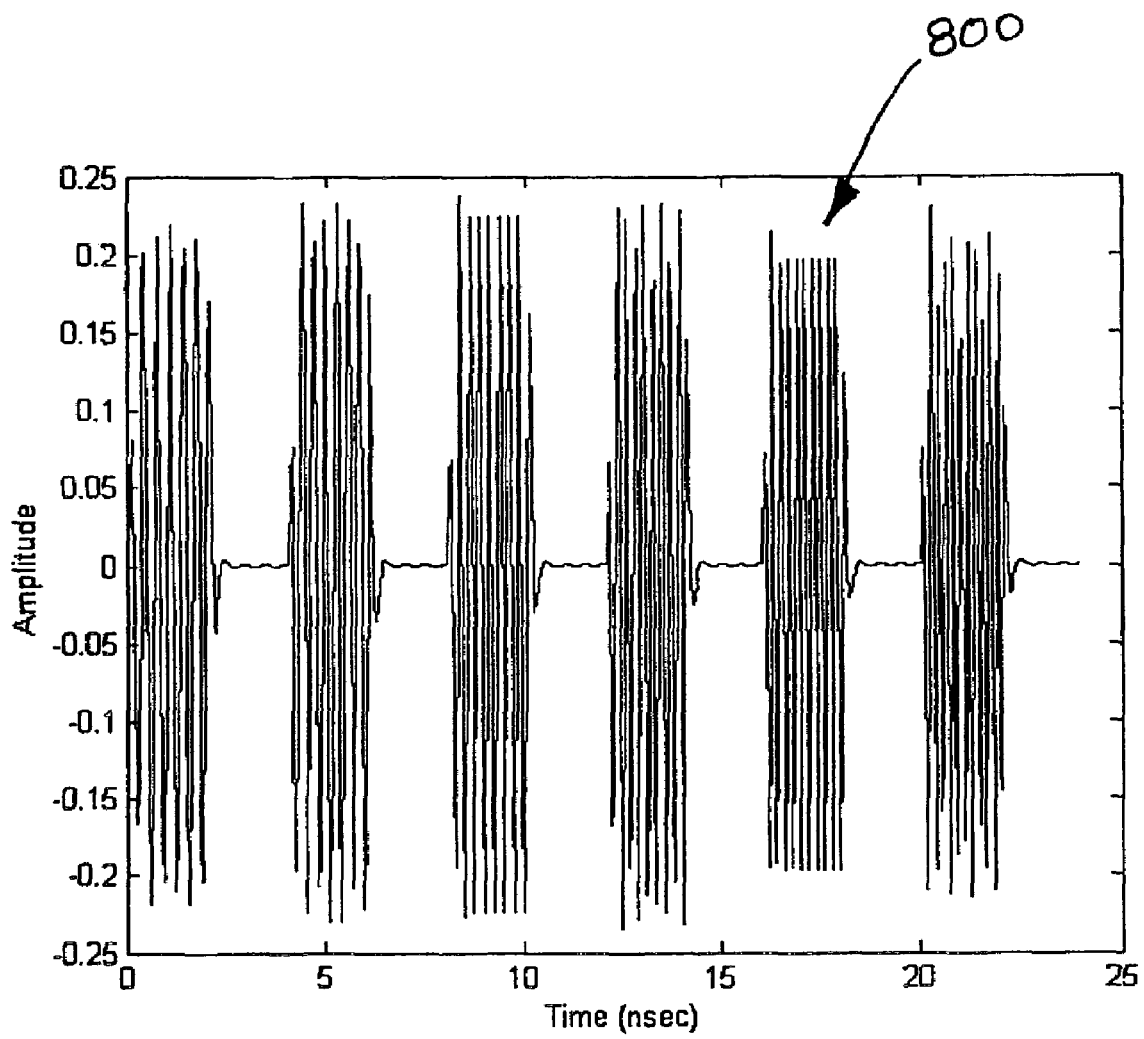
FIG. 8 is a diagram of a time domain representation of a sub-banded ultra-wideband waveform output in accordance with an embodiment of the present invention.
Figure 9:
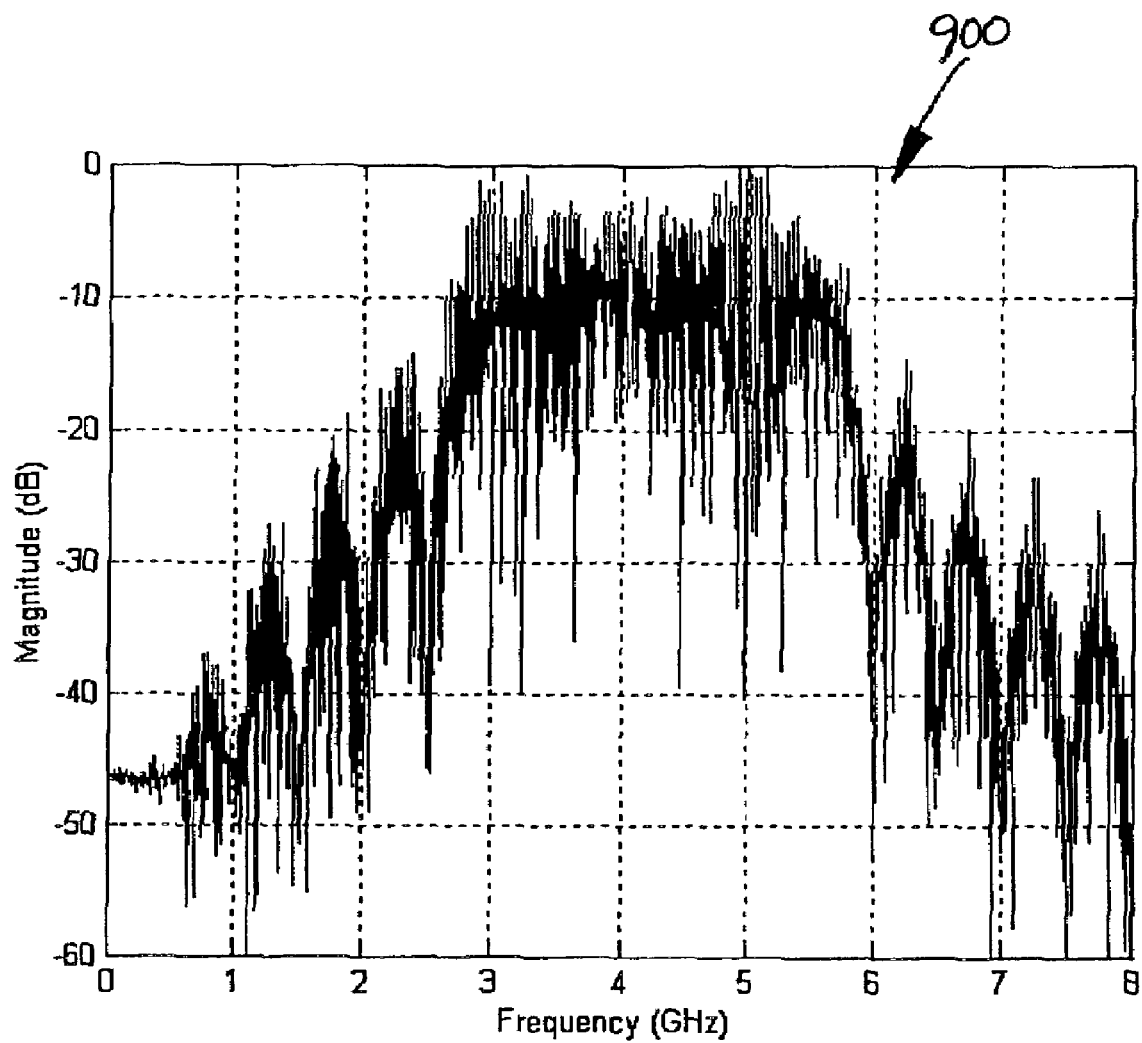
FIG. 9 is a diagram of a frequency spectrum of a sub-banded ultra-wideband waveform output in accordance with an embodiment of the present invention.
Figure 10:
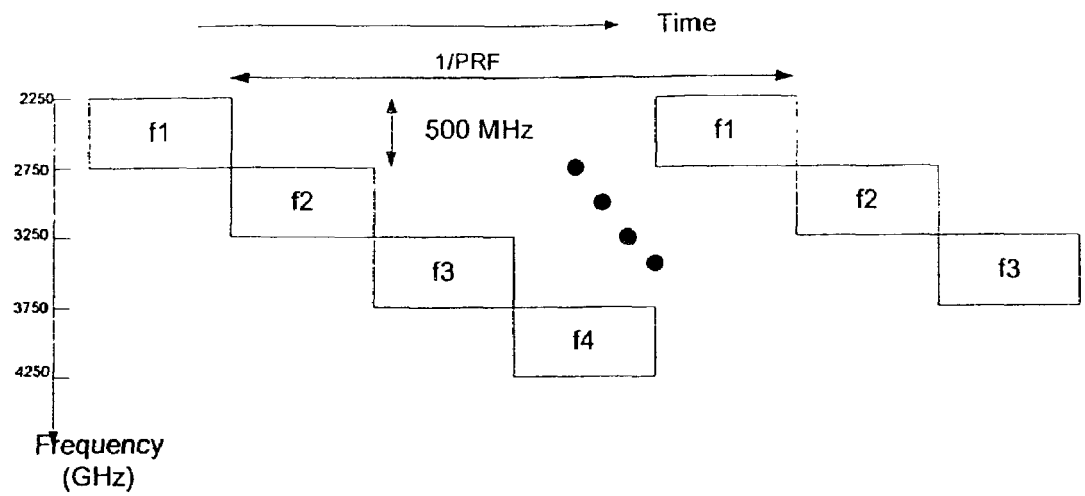
FIG. 10 is a diagram of a time-frequency plane representation of a multicarrier UWB signal in accordance with an embodiment of the present invention.
Figure 11:
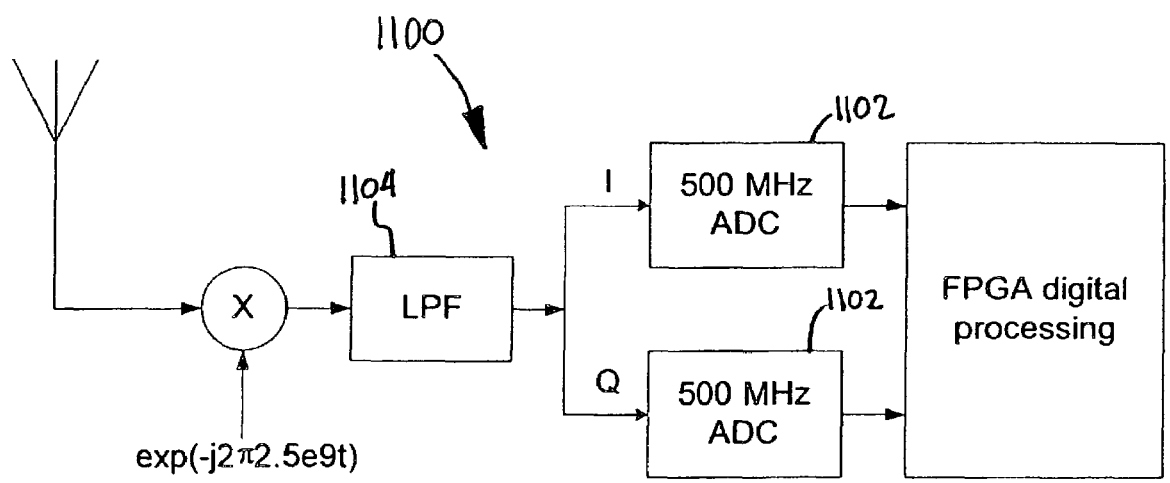
FIG. 11 is a diagram of a direct conversion receiver employing sub-sampling for a multicarrier UWB system in accordance with an embodiment of the present invention.

Referring now to FIG. 8, a diagram of a time domain representation of a sub-banded ultra-wideband waveform output in accordance with an embodiment of the present invention will be discussed. Also referring to FIG. 9, a diagram of a frequency spectrum of a sub-banded ultra-wideband waveform output in accordance with an embodiment of the present invention will be discussed. For the waveform output 800 of FIG. 8, and the transmitted waveform spectrum 900 of FIG. 9, a subsampling scheme may be utilized that allows efficient sampling and processing of individual sub-band signals. In an example embodiment, the multicarrier UWB system under consideration may have an overall signal bandwidth of 2 GHz and employ four subcarriers of bandwidths 500 MHz, which are transmitted sequentially, as shown in FIG. 8, and also in the example shown in FIG. 10, although the scope of the invention is not limited in this respect. Since at any given instant one of the subcarriers may be transmitted, in the example embodiment one complex analog-to-digital converter (ADC) 1102 as shown in FIG. 11 may be utilized at an effective rate of 500 MHz, which may sample any one of the subcarriers, although the scope of the invention is not limited in this respect. FIG. 10 shows a diagram of an example time-frequency plane representation of a multicarrier UWB signal in accordance with an embodiment of the present invention.

Referring now to FIG. 11, a diagram of a direct conversion receiver employing sub-sampling for a multicarrier UWB system in accordance with an embodiment of the present invention will be discussed. A direct down conversion zero intermediate-frequency (IF) receiver architecture 1100 may be first employed to down-convert the overall UWB signal bandwidth such that the subcarrier frequency, or the lowest frequency, may be down-converted to a zero IF as shown in the receiver architecture 1100 in FIG. 11, and two ADCs 1102 at a 500 MHz rate may be used to sample the I and Q signals, although the scope of the invention is not limited in this respect. The lowpass filter (LPF) 1104 following the downconverter may be wide enough to contain all sub-bands, only filtering out mixing products, or alternatively the LPF may be a sub-band select filter that is a bandpass filter that encompasses only a single sub-band at a particular time. Such a selectable bandpass filter may switch according to the transmitted order to the sub-bands. When the first UWB pulse is transmitted in the first sub-band, the complex ADC may capture samples of the transmitted pulse. Subsequent pulses may be transmitted on the other subcarrier frequencies in a predetermined sequence. The pulses and subcarriers may be subsampled by the 500 MHz complex analog-to-digital converter (ADC), although the scope of the invention is not limited in this respect.

Alternatively, the receiver shown in FIG. 11 may include a fixed LPF 1104 with a bandwidth equal to roughly the RF bandwidth of each sub-band, although the bandwidth may be variable for different implementations depending on the input bandwidths and sampling rates of ADC converter 1102, where the reference frequency at the input to the mixer may be varied in time to match the transmitted sub-band sequence. The reference waveform at the mixer input may essentially look like a replica of the transmitted waveform, as shown in FIG. 8, for the case of one sub-band transmitted at a time, and may be synchronized at the receiver through a training process similar to that used in other wireless communications systems, although the scope of the present invention is not limited in this respect.

Although the invention has been described with a certain degree of particularity, it should be recognized that elements thereof may be altered by persons skilled in the art without departing from the spirit and scope of the invention. It is believed that the sub-banded ultra-wideband communications system of the present invention and many of its attendant advantages will be understood by the forgoing description, and it will be apparent that various changes may be made in the form, construction and arrangement of the components thereof without departing from the scope and spirit of the invention or without sacrificing all of its material advantages, the form herein before described being merely an explanatory embodiment thereof, and further without providing substantial change thereto. It is the intention of the claims to encompass and include such changes.

What is claimed is:

1. A transmitter, comprising:
   a wideband pulse modulator to modulate a data sequence onto a plurality of wideband pulses with a selected duty cycle, the duty cycle being selected for reception without equalization;
   a plurality of sub-band filters each to generate a single sub-band of the wideband pulses, the sub-bands comprising concatenated orthogonal frequency division waveforms to each carry a portion of the data sequence;
   a gate to receive the sub-bands, to separate the sub-bands in time for time diversity, to spread the data sequence across the wideband, and to attenuate sub-bands that experience interference; and
   an upconverter to convert the sub-bands to radio-frequency bands for transmission.

2. The transmitter of claim 1, wherein the gate is to separate the sub-bands in time so that a single sub-band is transmitted at a time.

3. The transmitter of claim 1, wherein the gate is to attenuate sub-bands in proportion to the interference.

4. The transmitter of claim 1, wherein the gate is to attenuate sub-bands by not using any sub-band in which there is strong narrowband interference.

5. The transmitter of claim 4, wherein the gate overlays the wideband pulses on top of narrowband interference.

6. The transmitter of claim 1, wherein the gate includes a radio-frequency switch that operates at the pulse repetition rate.

7. The transmitter of claim 6, wherein the pulse repetition rate is a function of a desired transmit data rate.

8. The transmitter of claim 1, wherein the wideband pulse modulator utilizes direct sequence spreading on sub-bands of the sub-banded ultra-wideband waveform.

9. The transmitter of claim 1, wherein the wideband pulse modulator and the sub-band filters are comprised of a fast-Fourier transform structure to generate the sub-banded ultra-wideband waveform.

10. The transmitter of claim 1, wherein the gate comprises a multiple-gated, phased-carrier structure to generate the sub-banded ultra-wideband waveform.

11. The transmitter of claim 1, wherein the wideband pulse modulator is configured to utilize frequency-shift keying on sub-bands of the sub-banded ultra-wideband waveform.

12. A method comprising:
    modulating a data sequence onto a plurality of wideband pulses with a selected duty cycle, the duty cycle being selected for reception without equalization;
    filtering the plurality of wideband pulses with a plurality of sub-band filters each to generate a single sub-band of the wideband pulses, the sub-bands comprising concatenated orthogonal frequency division waveforms to each carry a portion of the data sequence;
    separating the sub-bands in time for time diversity;
    spreading the data sequence across the wideband;

attenuating sub-bands that experience interference; and
converting the sub-bands to radio-frequency bands for transmission.

13. The method of claim 12, wherein separating comprises separating the sub-bands in time so that a single sub-band is transmitted at a time.

14. The method of claim 12, wherein attenuating comprises attenuating sub-bands in proportion to the interference.

15. The method of claim 12, further comprising direct sequence spreading the data sequence on sub-bands of the sub-banded ultra-wideband waveform.

16. The method of claim 12, further comprising time-hopping on sub bands of the sub-banded ultra-wideband waveform.

17. The method of claim 12, further comprising frequency-shift-keying on sub-bands of the sub-banded ultra-wideband waveform.

18. The method of claim 12, further comprising frequency-hopping on sub-bands of the sub-banded ultra-wideband waveform.

* * * * *